(12) United States Patent
Miyazaki

(10) Patent No.: US 9,654,044 B2
(45) Date of Patent: May 16, 2017

(54) IMPACT ROTATION TOOL

(71) Applicant: PANASONIC INTELLECTUAL PROPERTY MANAGEMENT CO., LTD., Osaka (JP)

(72) Inventor: Hiroshi Miyazaki, Mie (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/975,452

(22) Filed: Dec. 18, 2015

(65) Prior Publication Data
US 2016/0190965 A1   Jun. 30, 2016

(30) Foreign Application Priority Data
Dec. 26, 2014   (JP) .................. 2014-265466

(51) Int. Cl.
| | |
|---|---|
| G05B 11/28 | (2006.01) |
| H02P 25/02 | (2016.01) |
| H02P 7/29 | (2016.01) |
| B25B 21/02 | (2006.01) |
| H02P 1/00 | (2006.01) |

(52) U.S. Cl.
CPC ............ *H02P 25/027* (2013.01); *B25B 21/02* (2013.01); *H02P 1/00* (2013.01); *H02P 7/29* (2013.01)

(58) Field of Classification Search
CPC ...... H02P 4/00; H02P 5/00; H02P 7/00; H02P 7/20; H02P 7/22; H02P 7/28; H02P 7/29; H02P 8/00; H02P 8/18; H02P 8/32; H02P 23/00; H02P 23/12
USPC .... 318/400.01, 400.02, 400.14, 400.15, 700, 318/701, 721, 779, 799, 800, 801, 430, 318/432, 437, 685, 696, 599, 811, 805; 363/21.1, 40, 44, 95, 120, 174, 175; 388/800, 819, 821; 173/90, 93.7, 217, 173/180, 181
See application file for complete search history.

(56) References Cited

U.S. PATENT DOCUMENTS 7,112,934 B2 * 9/2006 Gilmore ................ B23P 19/066
                                                                318/432

FOREIGN PATENT DOCUMENTS

JP          2010-076022 A        4/2010

* cited by examiner

*Primary Examiner* — Antony M Paul
(74) *Attorney, Agent, or Firm* — McDermott Will & Emery LLP

(57) ABSTRACT

An impact rotation tool includes a motor, a switching element that performs a switching operation based on a PWM control signal, and a controller that performs PWM control on the motor with the switching operation of the switching element. The controller includes a PWM control unit that generates the PWM control signal, an impact detector that detects whether or not an impact has been generated, and a control frequency switch unit that selects a control frequency of the PWM control signal from a first control frequency, which is in an audible range, and a second control frequency, which is higher than the frequency in the audible range. The controller outputs a PWM control signal having the second frequency when detecting that an impact has not been generated and outputs a PWM control signal having the first frequency when detecting that an impact has been generated.

6 Claims, 2 Drawing Sheets

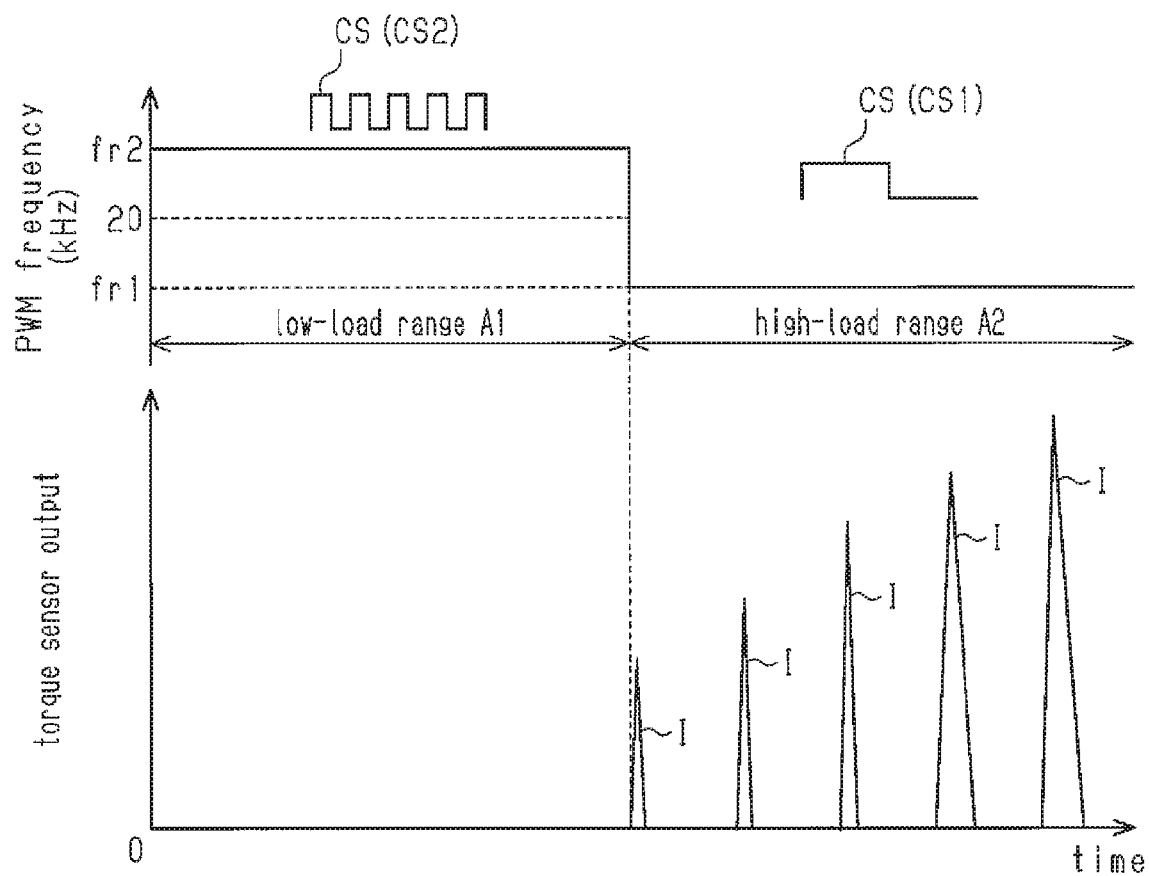

IMPACT ROTATION TOOL

RELATED APPLICATIONS

This application claims the benefit of Japanese Application No. 2014-265466, filed on Dec. 26, 2014, the disclosure of which Application is incorporated by reference herein.

TECHNICAL FIELD

The present invention relates to an impact rotation tool.

BACKGROUND ART

Conventional impact rotation tools perform PWM control on switching elements, which are connected in series to a motor, to regulate the power that is supplied to the motor (refer to, for example, Japanese Patent No. 2010-76022).

SUMMARY OF THE INVENTION

The frequency of PWM control may be changed when operating a power tool. An increase in the PWM frequency (switching frequency) may increase the heat generated by the switching elements. When the PWM frequency is decreased to the audible range of human ears (20 Hz to 20 kHz), the oscillation noise produced by the PWM control may be disturbing to the person operating the tool. The oscillation noise is produced when the switching elements perform switching operations.

It is an object of the present invention to provide an impact rotation tool that reduces heat generation in the switching elements and decreases the audible oscillation noise resulting from PWM control.

An impact rotation tool according to one embodiment of the present invention includes a motor, a switching element that performs a switching operation based on a PWM control signal, and a controller that performs PWM control on the motor with the switching operation of the switching element. The controller includes a PWM control unit that generates the PWM control signal, an impact detector that detects whether or not an impact has been generated, and a control frequency switch unit that selects a control frequency of the PWM control signal from a first control frequency, which is in an audible range, and a second control frequency, which is higher than the frequency in the audible range. The controller outputs a PWM control signal having the second frequency when detecting that an impact has not been generated and outputs a PWM control signal having the first frequency when detecting that an impact has been generated.

An impact rotation tool according to one embodiment of the present invention reduces heat generation in the switching elements and decreases the audible oscillation noise resulting from PWM control.

Other aspects and advantages of the invention will become apparent from the following description, taken in conjunction with the accompanying drawings, illustrating by way of example the principles of the invention.

BRIEF DESCRIPTION OF THE DRAWINGS

FIG. 3 is a graph illustrating the characteristics of the impact rotation tool shown in FIG. 1, in which the horizontal axis represents time, the vertical axis in the upper section represents the PWM frequency, and the vertical axis in the lower section represents the torque sensor output.

EMBODIMENTS OF THE INVENTION

One embodiment of an impact rotation tool will now be described with reference to the drawings.

Figure 1:
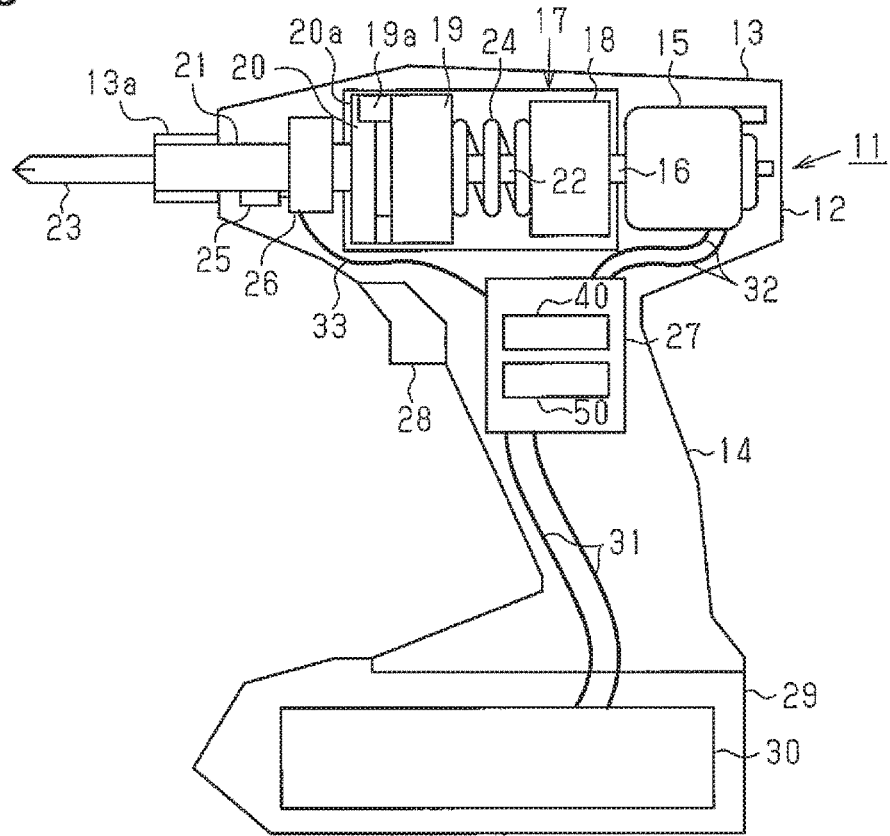
FIG. 1 is a schematic diagram showing one embodiment of an impact rotation tool.
Figure 2:
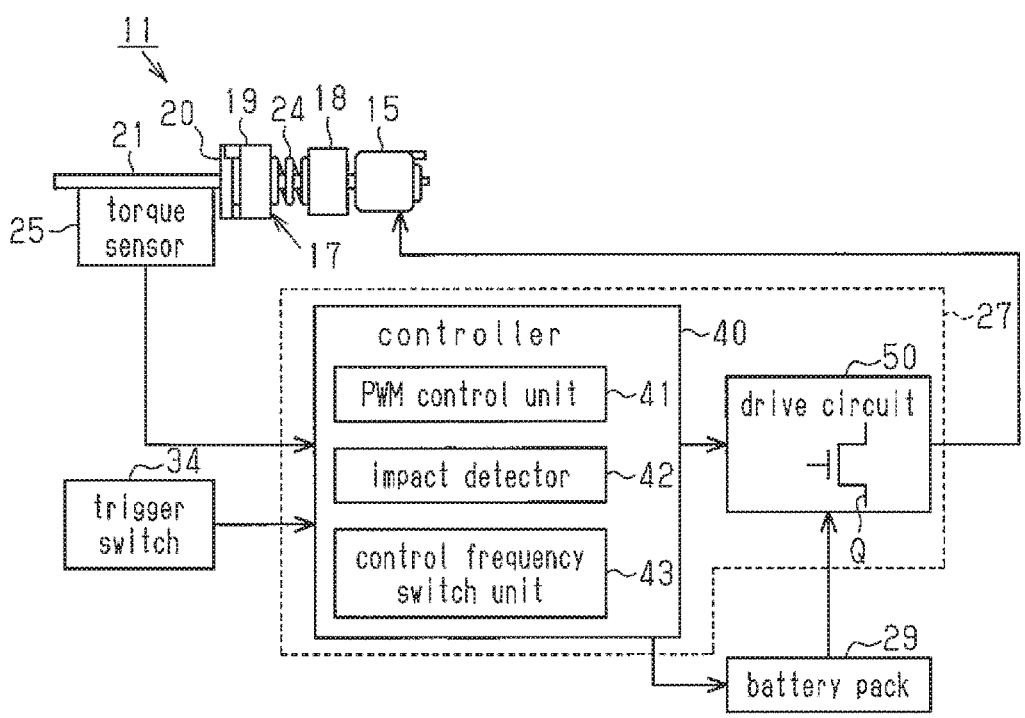
FIG. 2 is a block diagram of the impact rotation tool shown in FIG. 1.

As shown in FIGS. 1 and 2, an impact rotation tool 11 is a handheld tool that can be used as, for example, an impact driver or an impact wrench. A housing 12 of the impact rotation tool 11 includes a tubular barrel 13 and a handle 14, which extends downward from the barrel 13.

A motor 15, which serves as a drive source, is arranged at a basal end (right side as viewed in FIG. 1) of the barrel 13. The rotation axis of the motor 15 may lie along the axis of the barrel 13. An output shaft 16 of the motor 15 may be directed toward the distal end of the barrel 13 (left in FIG. 1). The motor 15 may be, for example, a direct current motor such as a brush motor or a brushless motor. The output shaft 16 of the motor 15 is connected to an impact force generator 17.

When the load is low, the impact force generator 17 reduces the speed of the rotation generated by the motor 15 to increase torque. When the load is high, the impact force generator 17 generates impact force from the rotation force of the motor. The impact force generator 17 includes a reduction drive 18, a hammer 19, an anvil 20, and a spindle 21. The reduction drive 18 reduces the rotation speed of the motor 15 at a predetermined reduction ratio. Rotation that is reduced in speed and increased in torque by the reduction drive 18 is transmitted to the hammer 19. The hammer 19 strikes the anvil 20 and rotates the spindle 21.

The hammer 19 is rotatable about a drive shaft 22 of the reduction drive 18 and movable along the drive shaft 22 toward the front and rear. The hammer 19 is biased toward the front (left side as viewed in FIG. 1) by a coil spring 24, which is arranged between the reduction drive 18 and the hammer 19. This forces the hammer 19 against the anvil 20. The hammer 19 includes two projections 19a. The anvil 20 includes two projections 20a, which engage the hammer 19 when the hammer 19 rotates at a forward position. The reduction drive 18 transmits the reduced rotation speed of the drive shaft 22 to the spindle 21, which is coaxial with the anvil 20, when the hammer 19 and the anvil 20 are integrally rotated. A chuck 13a is arranged at the distal end of the barrel 13. A bit 23 is attached to the chuck 13a in a removable manner.

When the spindle 21 and the bit 23 are integrally rotated to fasten or loosen a fastener such as a bolt, the fastener applies high load to the spindle 21, and torque of a predetermined value or greater is applied between the hammer 19 and the anvil 20. This moves the hammer 19 toward the rear (rightward as viewed in FIG. 1) along the drive shaft 22 while compressing the coil spring 24. When the projections 19a of the hammer 19 and the projections 20a of the anvil 20 are disengaged, the hammer 19 rotates freely. The biasing force of the coil spring 24 moves the freely rotating hammer 19 toward the anvil 20 so that the hammer 19 strikes the anvil 20 again when engaged the next time. The striking of the hammer 19 is repeated whenever the hammer 19 rotates freely relative to the anvil 20 against the biasing force of the coil spring 24. In this manner, the impact rotation tool 11 fastens and loosens a fastener such as a bolt.

A torque sensor 25 may be attached to the spindle 21 of the impact rotation tool 11. The torque sensor 25 detects whether or not an impact has been generated based on the detection of impact torque. The torque sensor 25 may include, for example, a distortion sensor. The torque sensor 25 detects the distortion of the spindle 21 when the spindle 21 receives impact torque and outputs a torque detection signal I (refer to FIG. 3) having a voltage that is in accordance with the distortion. The torque detection signal I is provided via a slip ring 26, which is incorporated into the spindle 21, to a circuit board 27 (controller 40).

The handle 14 includes a trigger lever 28, which is operated by a user when driving the impact rotation tool 11. The circuit board 27 is accommodated in the handle 14. The circuit board 27 includes the controller 40 and a drive circuit 50, which drive and control the motor 15. A battery pack 29 is attached in a removable manner to the lower end of the handle 14. The battery pack 29 is attached to the lower end of the handle 14 when using the tool 11. The battery pack 29 incorporates, for example, a rechargeable battery 30.

The circuit board 27 is connected to the rechargeable battery 30 of the battery pack 29 by, for example, power wires 31. The circuit board 27 is connected to the motor 15 by, for example, power wires 32. The circuit board 27 is connected to the torque sensor 25 (slip ring 26) by, for example, signal wires 33. The circuit board 27 is connected to a trigger switch 34 (refer to FIG. 2), which detects the operation amount (pulled amount) of the trigger lever 28.

The electric configuration and control of the impact rotation tool 11 will now be described with reference to FIGS. 2 and 3.

The controller 40 receives, from the trigger switch 34, an operation signal that is in accordance with the operation amount (pulled amount) of the trigger lever 28. The controller 40 receives, from the torque sensor 25, a torque detection signal that is in accordance with the impact torque applied to the spindle 21. The controller 40 generates a PWM control signal based on various input signals that include the operation signal and the torque detection signal I. Then, the controller 40 provides the PWM control signal to the drive circuit 50.

The drive circuit 50 may include, for example, a bridge circuit that uses switching elements Q such as MOSFETs. The switching elements Q perform a switching operation based on the PWM control signal from the controller 40. The drive circuit 50 is supplied with power from the battery pack 29 (rechargeable battery 30), generates drive power in accordance with the switching operation of the switching elements Q, and supplies the drive power to the motor 15. Accordingly, the drive circuit 50 drives the motor 15 based on the PWM control signal of the controller 40.

The controller 40 of the present embodiment is configured to change or switch the control frequency of the PWM control signal, which is provided to the drive circuit 50, in accordance with the tool conditions. In the illustrated example, the controller 40 includes a PWM control unit 41, an impact detector 42, and a control frequency switch unit (selector) 43.

As shown in FIG. 3, when the impact rotation tool 11 is operated in a low-load range A1, impact torque is not generated. Thus, the torque sensor 25 does not output the torque detection signal I. When the impact rotation tool 11 is operated in a high-load range A2, impact torque is generated. Thus, the torque sensor 25 outputs the torque detection signal I whenever impact torque is generated. The impact detector 42 detects (or determines) whether or not an impact has been generated based on the input of the torque detection signal I, that is, whether the impact rotation tool 11 is operated in the low-load range A1 or the high-load range A2.

In accordance with the detection of the impact detector 42, the control frequency switch unit 43 selects the control frequency of a PWM control signal from an audible first control frequency fr1, which is lower than 20 kHz (upper limit of audible range), and a non-audible second control frequency fr2, which is higher than 20 kHz.

The switching elements Q perform a switching operation in accordance with a PWM control signal. The switching elements Q generate more heat when the control frequency of the PWM control signal is high and less heat when the control frequency of the PWM control signal is low. To decrease the heat generated by the switching elements Q, it is preferred that the control frequency of the PWM control signal be low. However, if the control frequency is decreased to the audible range of 20 kHz or lower, the switching operation of the switching elements Q increases oscillation noise in the audible range. This may be disturbing to the user.

The impact rotation tool 11 of the present embodiment uses impact noise to mask the oscillation noise so that the oscillation noise is heard less. The impact noise refers to noise that is generated when the hammer 19 strikes the anvil 20. More specifically, in the controller 40 of the present embodiment, the impact detector 42 detects whether the tool 11 is in the low-load range A1, in which an impact is not generated, or the high-load range A2, in which an impact is generated. When the impact detector 42 detects the low-load range A1, in which an impact is not generated, the control frequency switch unit 43 selects the control frequency fr2, which is higher than 20 kHz. The PWM control unit 41 generates a PWM control signal CS2 having the non-audible control frequency fr2 that is selected by the control frequency switch unit 43. The controller 40 drives and controls the motor 15 in this manner. Thus, when the impact rotation tool 11 is operated in the low-load range A1, the generation of audible oscillation noise from the switching elements Q is limited. This enables the impact rotation tool to be operated in a relatively quiet manner.

When the impact detector 42 detects the high-load range A2, the control frequency switch unit 43 selects the control frequency fr1, which is lower than 20 kHz. The PWM control unit 41 generates a PWM control signal CS1 having the control frequency fr1 that is selected by the control frequency switch unit 43. The controller 40 drives and controls the motor 15 in this manner. Thus, when the impact rotation tool 11 is operated in the high-load range A2, the oscillation noise in the audible range generated by the switching elements Q is masked by the impact noise. Further, the switching element Q performs a switching operation in accordance with the PWM control signal CS1 having the audible control frequency fr1. This decreases heat. Accordingly, the impact rotation tool 11 of the present embodiment decreases heat and reduces disturbing oscillation noise.

The present embodiment has the advantages described below.

(1) The controller 40 of the impact rotation tool 11 of the present embodiment includes the PWM control unit 41, which generates a PWM control signal, the impact detector 42, which detects whether or not an impact is generated, and the control frequency switch unit 43, which selects the control frequency of a PWM control signal from the audible control frequency fr1 and the non-audible control frequency fr2, which is higher than the audible range control frequency fr1. When the impact detector 42 detects a state in which an impact is not generated, the control frequency switch unit 43 selects the control frequency fr2. When the impact detector 42 detects a state in which an impact is generated, the control frequency switch unit 43 selects the control frequency fr1. When an impact is not generated (low-load range A1), the PWM control signal CS2 having the non-audible control frequency fr2 is generated. This limits oscillation noise that is generated in the audible range. When an impact is generated (high-load range A2), the PWM control signal CS1 having the audible control frequency fr1 is generated. In this case, audible oscillation noise is masked by the impact noise. Thus, the user is not disturbed. Further, the switching elements Q perform a switching operation at the low control frequency fr1. This decreases heat. Accordingly, the impact rotation tool 11 of the present embodiment reduces switching loss and reduces disturbing oscillation noise.

(2) The impact detector 42 is configured to detect whether or not an impact has been generated based on impact torque detection of the torque sensor 25. This facilitates and ensures detection of whether or not the impact is generated.

It should be apparent to those skilled in the art that the present invention may be embodied in many other specific forms without departing from the spirit or scope of the invention. Particularly, it should be understood that the present invention may be embodied in the following forms.

A microphone, for example, may detect the generation of an impact.

The PWM control unit 41, the impact detector 42, and the control frequency switch unit 43 may be hardware, software, firmware, or a combination thereof. For example, the PWM control unit 41, the impact detector 42, and the control frequency switch unit 43 may include one or more processors and one or more memories that store a program including instructions executed by the processor(s). When executing the program, the one or more processors realize the functions of the PWM control unit 41, the impact detector 42, and the control frequency switch unit 43. Each processor is, for example, a CPU. Each memory may store the control frequencies fr1 and fr2. The processor is configured to determine the duty cycle of a PWM control signal in accordance with the operation signal received from the trigger switch 34 and to switch the control frequencies fr1 and fr2 in accordance with the torque detection signal I received from the torque sensor 25. For example, when the trigger lever 28 is operated in the low-load range A1, the processor generates the PWM control signal CS2 having the duty cycle that is in accordance with the operation amount of the trigger lever 28 and the non-audible control frequency fr2. When the trigger lever 28 is operated in the high-load range A2, the processor generates the PWM control signal CS1 having the duty cycle that is in accordance with the operation amount of the trigger lever 28 and the audible control frequency fr1. When the low-load range A1 is switched to the high-load range A2 while the operation amount of the trigger lever 28 remains fixed (refer to FIG. 3), the processor switches the frequency of the PWM control signal from the non-audible control frequency fr2 to the audible control frequency fr1 while maintaining a fixed duty cycle in accordance with the fixed operation amount.

The present examples and embodiments are to be considered as illustrative and not restrictive, and the invention is not to be limited to the details given herein, but may be modified within the scope and equivalence of the appended claims.

The invention claimed is:

1. An impact rotation tool comprising:
   a motor;
   a switching element that performs a switching operation based on a PWM control signal; and
   a controller that performs PWM control on the motor with the switching operation of the switching element;
   wherein
   the controller includes:
      a PWM control unit that generates the PWM control signal;
      an impact detector that detects whether or not an impact has been generated; and
      a control frequency switch unit that selects a control frequency of the PWM control signal from a first control frequency, which is in an audible range, and a second control frequency, which is higher than the frequency in the audible range; and
   the controller outputs a PWM control signal having the second frequency when detecting that an impact has not been generated and outputs a PWM control signal having the first frequency when detecting that an impact has been generated.

2. The impact rotation tool according to claim 1, wherein the impact detector detects whether or not an impact has been generated based on detection of an impact torque by a torque sensor.

3. The impact rotation tool according to claim 1, wherein the impact detector detects whether or not the impact is generated based on detection of an impact noise by a microphone.

4. An impact rotation tool comprising:
   an electric motor;
   a motor driver connected to the electric motor, wherein the motor driver includes a switching element that is operated in accordance with a PWM control signal; and
   a controller connected to the motor driver, wherein the controller provides the PWM control signal to the motor driver;
   wherein
   the controller includes:
      one or more memories that store a program including instructions; and
      one or more processors that are able to execute the program of the one or more memories, and
   during execution of the program, the processor is configured to:
      generate, when the impact rotation tool produces an impact, a PWM control signal having a duty cycle that is in accordance with an operation amount of a trigger lever of the impact rotation tool and an audible control frequency; and
      generate, when the impact rotation tool does not produce an impact, a PWM control signal having a duty cycle that is in accordance with the operation amount of the trigger lever of the impact rotation tool and a non-audible control frequency, wherein the non-audible control frequency is higher than the audible control frequency.

5. The impact rotation tool according to claim 4, wherein when the impact rotation tool shifts from a non-impact state to an impact application state, the processor switches a control frequency of the PWM control signal from the non-audible control frequency to the audible control frequency.

6. The impact rotation tool according to claim 4, wherein the one or more memories store the audible control frequency and the non-audible control frequency.

* * * * *